(12) United States Patent
Kosaka et al.

(10) Patent No.: US 9,533,414 B2
(45) Date of Patent: Jan. 3, 2017

(54) TORQUE DETECTING METHOD AND ARM DEVICE

(71) Applicants: Yusuke Kosaka, Chofu (JP); Kunihiro Okamoto, Oota-Ku (JP)

(72) Inventors: Yusuke Kosaka, Chofu (JP); Kunihiro Okamoto, Oota-Ku (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/386,410

(22) PCT Filed: Mar. 18, 2013

(86) PCT No.: PCT/IB2013/000638
§ 371 (c)(1),
(2) Date: Sep. 19, 2014

(87) PCT Pub. No.: WO2013/140248
PCT Pub. Date: Sep. 26, 2013

(65) Prior Publication Data
US 2015/0045952 A1 Feb. 12, 2015

(30) Foreign Application Priority Data
Mar. 21, 2012 (JP) ................. 2012-064319

(51) Int. Cl.
*G05B 15/00* (2006.01)
*G05B 19/00* (2006.01)
(Continued)

(52) U.S. Cl.
CPC ............. *B25J 9/1633* (2013.01); *B25J 9/16* (2013.01); *B25J 9/1692* (2013.01); *G01L 5/226* (2013.01); *G01L 25/003* (2013.01)

(58) Field of Classification Search
USPC .. 700/245, 258; 318/568.21; 623/27; 901/14, 19, 27, 46
See application file for complete search history.

(56) References Cited

U.S. PATENT DOCUMENTS 5,136,227 A   8/1992  Nakano et al.
8,512,415 B2* 8/2013  Herr .................. A61F 2/60
                                                623/24
(Continued)

FOREIGN PATENT DOCUMENTS

| JP | 62-060010 A | 3/1987 |
| JP | 62-074594 A | 4/1987 |
| JP | 03-073282 A | 3/1991 |

*Primary Examiner* — Ronnie Mancho
(74) *Attorney, Agent, or Firm* — Andrews Kurth Kenyon LLP (57) ABSTRACT

According to a torque detecting method, gravitational torque applied to a rotary shaft of an arm is detected in a condition where position control of the arm is stopped, when the arm is located at a first position at which the arm is oriented in a direction different from a direction of gravitational force. Then, a gravity coefficient used for calculating gravitational torque corresponding to a position of the arm is calculated, based on the gravitational torque and the first position. Then, gravitational torque during position control is calculated, based on the position of the arm detected during the position control, and the gravity coefficient. Further, an actual output torque during the position control is calculated, based on operating torque applied to the rotary shaft and detected during the position control, and the gravitational torque calculated during the position control.

7 Claims, 5 Drawing Sheets

(51) Int. Cl.
*B25J 9/16* (2006.01)
*G01L 5/22* (2006.01)
*G01L 25/00* (2006.01)

(56) References Cited

U.S. PATENT DOCUMENTS

| | | | | |
|---|---|---|---|---|
| 2007/0013336 | A1* | 1/2007 | Nowlin | A61B 19/2203 318/568.21 |
| 2007/0016329 | A1* | 1/2007 | Herr | B62D 57/032 700/250 |
| 2008/0009771 | A1* | 1/2008 | Perry | B25J 9/0006 600/587 |
| 2010/0113980 | A1* | 5/2010 | Herr | A61F 2/60 600/587 |
| 2010/0324699 | A1* | 12/2010 | Herr | A61F 2/66 623/27 |
| 2011/0082566 | A1* | 4/2011 | Herr | A61F 2/60 623/24 |
| 2013/0310979 | A1* | 11/2013 | Herr | B25J 9/1694 700/258 |
| 2014/0039681 | A1* | 2/2014 | Bowling | A61B 19/2203 700/261 |
| 2015/0051519 | A1* | 2/2015 | Morbi | A61H 3/04 601/26 |
| 2015/0209961 | A1* | 7/2015 | Komatsu | B25J 9/1676 700/255 |

* cited by examiner

1) MOVE ARM TO THE RIGHT
(VELOCITY IS POSITIVE (+)
IN RIGHT-HAND DIRECTION)

USE CORRECTION VALUE FOR RIGHT-HAND DIRECTION

KEEP ROTATIONAL DIRECTION

FIG. 5B

2) STOP MOVEMENT
(VELOCITY IS ±0)

KEEP USING CORRECTION VALUE FOR RIGHT-HAND DIRECTION

KEEP ROTATIONAL DIRECTION BEFORE STOPPING

FIG. 5C

3) START MOVING ARM
IN REVERSE DIRECTION
(VELOCITY IS POSITIVE (+)
IN LEFT-HAND DIRECTION)

SWITCH TO INTERMEDIATE CORRECTION VALUE

RECOGNIZE NEW ROTATIONAL DIRECTION

FIG. 5D

4) KEEP MOVING ARM
IN REVERSE DIRECTION
(VELOCITY IS POSITIVE (+)
IN LEFT-HAND DIRECTION)

USE CORRECTION VALUE FOR LEFT-HAND DIRECTION

KEEP ROTATIONAL DIRECTION

TORQUE DETECTING METHOD AND ARM DEVICE

CROSS-REFERENCE TO RELATED APPLICATIONS

This is a national phase application based on the PCT International Patent Application No. PCT/IB2013/000638 filed Mar. 18, 2013, which claims priority to Japanese Patent Application No. JP 2012-064319, filed on Mar. 21, 2012, the entire contents of which are incorporated herein by reference.

BACKGROUND OF THE INVENTION

1. Field of the Invention

The invention relates to a torque detecting method and an arm device.

2. Description of Related Art

When servo control is performed on a single-axis arm, using force (torque) detected with a torque sensor, compensation needs to be made in view of the effect of self-weight torque, mechanical deviation arising upon mounting of the torque sensor, frictional force produced during rotation of the arm, and so forth.

A gravity compensation method of a control system that performs force control is disclosed in Japanese Patent Application Publication No. 62-60010 (JP 62-60010 A). According to the gravity compensation method of JP 62-60010A, a gravity coefficient for an arm angle is calculated in advance, based on the mass of the arm and the position of the center of gravity of the arm. Then, during operation of the arm, gravity compensation torque is obtained, using the gravity coefficient corresponding to the arm angle, and gravity compensation is made using the gravity compensation torque.

However, in the gravity compensation method described in JP 62-60010 A, there is a need to accurately grasp the mass of the arm and the position of the center of gravity of the arm, so as to correctly compensate for the self-weight torque (gravitational torque) of the arm which changes according to the angle of the arm. This process may be cumbersome.

SUMMARY OF THE INVENTION

The invention provides a torque detecting method and an arm device, which make it possible to easily make gravity compensation.

A torque detecting method according to one aspect of the invention is a method of detecting actual output torque applied to a rotary shaft of an arm subjected to position control. The torque detecting method includes the steps of: detecting gravitational torque applied to the rotary shaft in a condition in which the position control of the arm is stopped, when the arm is located at a first position at which the arm is oriented in a direction that is different from a direction of gravitational force, calculating a gravity coefficient used for calculating the gravitational torque corresponding to a position of the arm, based on the gravitational torque and the first position, detecting operating torque applied to the rotary shaft during the position control of the arm, detecting the position of the arm during the position control of the arm and calculating the gravitational torque during the position control, based on the position of the arm detected during the position control, and the gravity coefficient, and calculating the actual output torque during the position control, based on the operating torque detected during the position control, and the gravitational torque calculated during the position control. According to this method, gravity compensation can be made without grasping the mass of the arm and the position of the center of gravity of the arm.

The torque detecting method may further include the steps of: detecting pre-change torque applied to the rotary shaft, in a condition in which the arm is located at a second position, detecting post-change torque applied to the rotary shaft in a condition in which the arm is located at the second position again, after rotating the arm from the second position to a third position and rotating the arm from the third position back to the second position, and calculating a correction value, based on the pre-change torque and the post-change torque. In this method, the actual output torque during the position control may be calculated, based on the operating torque, the gravitational torque, and the correction value. According to this method, a torque error associated with mechanical deviation can be removed. Therefore, the actual output torque can be calculated with high accuracy.

The correction value may include a first correction value corresponding to a first rotational direction of the arm, and a second correction value corresponding to a second rotational direction of the arm, and the actual output torque may be calculated, based on a correction value corresponding to a rotational direction of the arm determined during the position control, which correction value is selected from the first correction value and the second correction value. Thus, even in the case where mechanical deviation is different depending on the rotational direction, the actual output torque can be calculated with high accuracy.

The actual output torque may be calculated, based on an intermediate correction value between the first correction value and the second correction value, for a given period immediately after the rotational direction of the arm switches from the first rotational direction to the second rotational direction during the position control. As a result, the correction value can be prevented from being rapidly changed when the rotational direction is switched. Therefore, the actual output torque changes smoothly.

The intermediate correction value may increase or decrease according to change in a rotational velocity of the arm. As a result, the actual Output torque changes more smoothly.

The gravity coefficient may be calculated based on the correction value. As a result, an error associated with mechanical deviation can also be removed in the calculation of the gravity coefficient. Therefore, the actual output torque can be calculated with even higher accuracy.

An arm device according to another aspect of the invention includes an arm operable to rotate integrally with a rotary shaft, a driving device that drives and rotates the arm, a torque detector that detects torque applied to the rotary shaft of the arm, a position detector that detects a position of the arm, and a controller that outputs a control signal to the driving device so as to perform position control on the arm. In the arm device, the torque detector detects gravitational torque applied to the rotary shaft in a condition in which the controller stops the position control of the arm, when the arm is located at a first position at which the arm is oriented in a direction that is different from a direction of gravitational force, and the controller calculates a gravity coefficient used for calculating gravitational torque corresponding to a position of the arm, based on the gravitational torque and the first position. The controller then calculates the gravitational torque during the position control, based on the position of the arm detected by the position detector during the position control of the arm, and the gravity coefficient, and calculates actual output torque applied to the rotary shaft during the position control, based on operating torque applied to the rotary shaft and detected by the position detector during the position control, and the gravitational torque calculated during the position control. The controller outputs the control signal to the driving device, based on the actual output torque, so as to rotate the arm. With the arm device thus constructed, gravity compensation can be made without grasping the mass of the arm and the position of the center of gravity of the arm.

According to the invention, the torque detecting method and arm device which can easily make gravity compensation are provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A-FIG. 3C are views useful for explaining detection of mechanical deviation according to a method as one embodiment of the invention, wherein FIG. 3A shows the case where the rotational angle of a rotary shaft is 0°, FIG. 3B shows the case where the rotational angle of the rotary shaft is 45°, and FIG. 3C shows the case where the rotational angle of the rotary shaft is 0°;

FIG. 4A-FIG. 4C are views useful for explaining calculation of a gravity coefficient according to the embodiment, wherein FIG. 4A shows an operation to change the rotational angle of the rotary shaft to 45°, FIG. 4B shows a condition in which motor control is stopped, and FIG. 4C shows an operation to detect only the gravitational torque;

FIG. 5A-FIG. 5D are views useful for explaining calculation of actual output torque according to the embodiment, wherein FIG. 5A shows a condition in which the arm is moved to the right, FIG. 5B shows a condition in which the movement of the arm is stopped, FIG. 5C shows a condition immediately after the arm starts being moved to the left, and FIG. 5D shows a condition in which the arm is moved to the left.

DETAILED DESCRIPTION OF EMBODIMENTS

Figure 1:
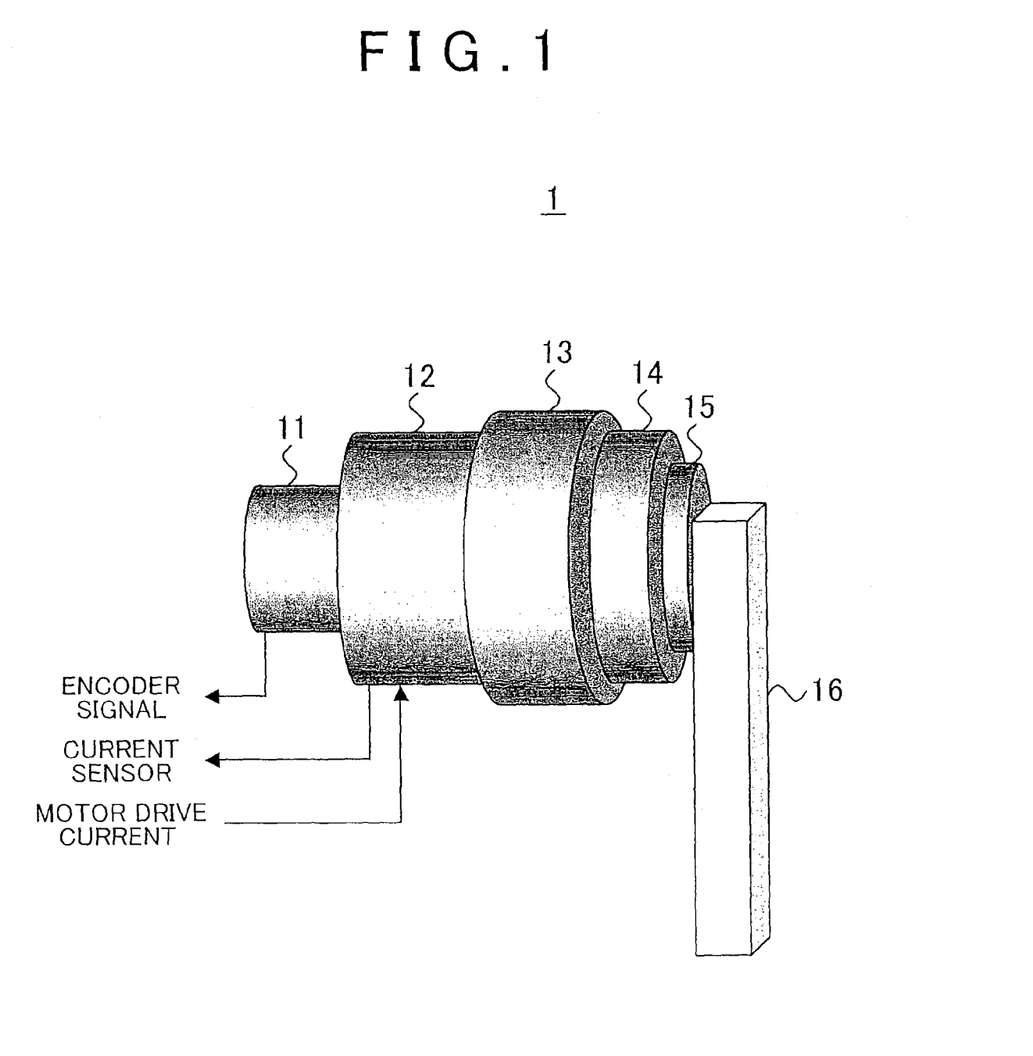
FIG. 1 is a schematic view of an arm device according to one embodiment of the invention.
Figure 2:
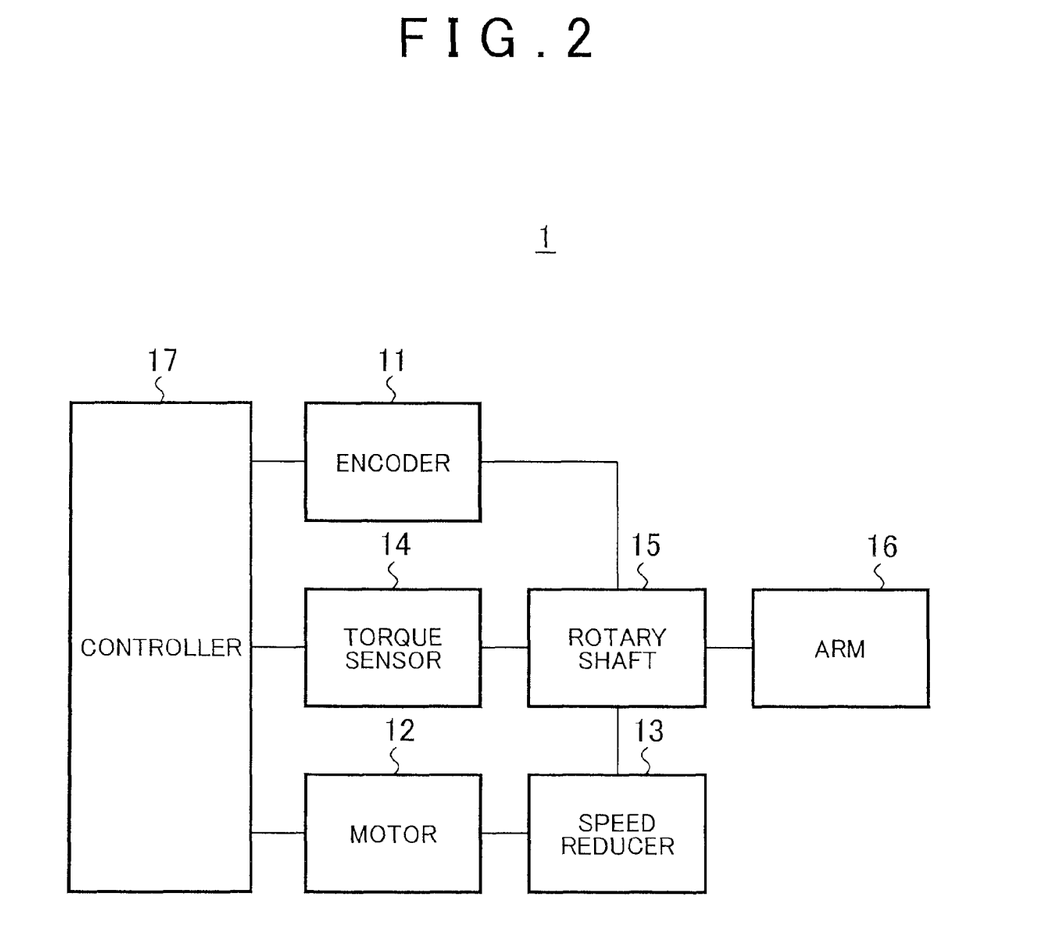
FIG. 2 is a block diagram of the arm device according to the embodiment of FIG. 1.

One embodiment of the invention will be described with reference to the drawings. FIG. 1 schematically illustrates the construction of an arm device 1 according to the embodiment. FIG. 2 is a block diagram of the arm device 1. The arm device 1 includes an encoder 11, a motor 12, a speed reducer 13, a torque sensor 14, a rotary shaft 15, an arm 16, and a controller 17. As shown in FIG. 1, the arm device 1 is a single-axis arm. In this embodiment, a gravity compensating method of a single-axis control system will be described.

The encoder 11 (corresponding to the above-mentioned position detector) detects the angle (position), amount of rotation, angular velocity, etc. of the rotary shaft 15. The encoder 11 outputs an encoder signal representing the detected angle, amount of rotation, angular velocity, etc., to the controller 17. In this manner, the angle of the arm 16, for example, is detected.

The motor 12 receives motor drive current generated from the controller 17. The motor 12 is driven or rotated at a rotational speed corresponding to the motor drive current, to produce output torque corresponding to the motor drive current. The output torque and rotational speed of the motor 12 are transmitted as a current sensor signal to the controller 17.

The speed reducer 13 converts the output torque and rotational speed of the motor 12 at a certain speed reduction ratio. The speed reducer 13 then rotates the rotary shaft 15 at the speed that has been converted, with the output torque that has been converted. The reduction ratio of the reducer 13 is set as appropriate by the user of the arm device 1.

The torque sensor 14 (corresponding to the above-mentioned torque detector) detects torque applied to the rotary shaft 15, by external force received by the arm 16. For example, the torque includes gravitational torque, torque applied when the arm 16 changes the position of an object or moves an object (or when the arm 16 does work on an object), and so forth. The gravitational torque means torque applied to the rotary shaft 15 due to an influence of the force of gravity (or self weight) on the arm 16.

The output torque converted by the speed reducer 13 acts on the rotary shaft 15. The rotary shaft 15 and the arm 16 are integrally coupled with each other. When the rotary shaft 15 rotates, the arm 16 also rotates about the rotary shaft 15.

The controller 17 in the form of a CPU (Central Processing Unit), for example, controls the operation of each block of the arm device 1, according to a control program(s) stored in a memory (not shown). The controller 17 detects the angle (position) of the arm 16, based on the above-mentioned encoder signal. The controller 17 also calculates actual output torque applied to the rotary shaft 15. Further, the controller 17 adjusts the motor drive current and controls rotation or driving of the motor 12, based on the angle of the arm 16, current sensor signal and the actual output torque. Namely, the controller 17 performs feedback control so that the motor 12 produces desired torque. In this manner, position control (servo control) for making the angle of the arm 16 equal to a desired angle is implemented.

Subsequently, an example of operation of the arm device 1 according to this embodiment will be described. The torque detecting method according to this embodiment is roughly divided into three flows, namely, "detection of mechanical deviation", "calculation of gravity coefficient", and "calculation of actual output torque". In the following, each flow will be described in detail. The "detection of mechanical deviation" and "calculation of gravity coefficient" are carried out once in advance, before servo control of the arm 16 is performed.

Figure 3A:
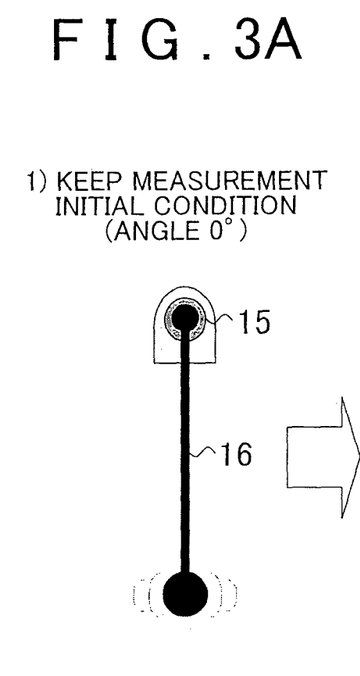
Figure 3B:
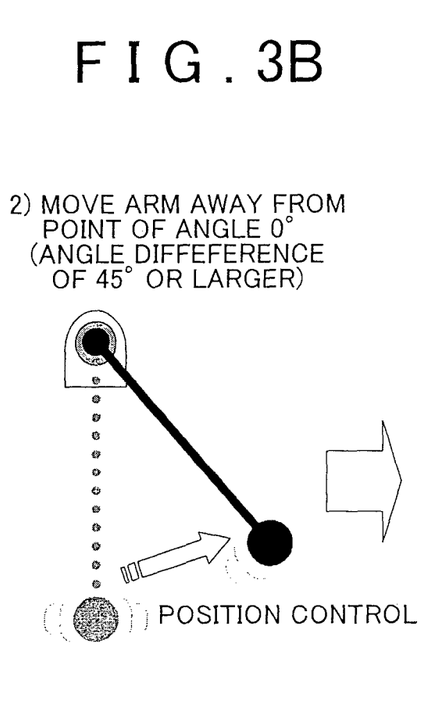
Figure 3C:
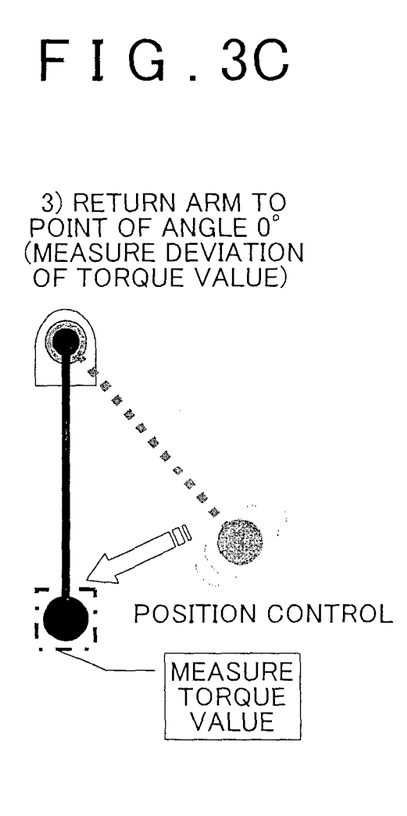

Initially, mechanical deviation is detected. More specifically, mechanical or physical deviations that arise in the rotary motion of the arm 16 (e.g., variations in friction and/or bearing during rotation of the rotary shaft 15, asymmetry of the mounting position of the torque sensor 14, etc.) are detected. FIG. 3A-FIG. 3C are useful for explaining the operation of the arm device 1 according to the mechanical deviation detection flow. FIG. 3A-FIG. 3C are views as seen from the front of the arm device 1 shown in FIG. 1, in the axial direction of the rotary shaft 15. In the arm device 1, the arm 16 is rotatable in both directions, namely, in the right-hand direction and the left-hand direction as viewed in FIGS. 3A-3C.

Initially, the controller 17 generates motor drive current so as to move the arm 16 to an angular position at which the arm 16 receives the least self weight (i.e., substantially no gravitational torque is applied to the rotary shaft 15). While the arm 16 is placed in the angular position at which it receives the least self weight, values of the encoder and the torque sensor are reset. The arm 16 is in the angular position at which it receives the least self weight when the arm 16 is oriented in the direction of the force of gravity (see FIG. 3A), namely, when the longitudinal direction of the arm 16 coincides with the direction of the force of gravity. In this condition, the rotational angle of the rotary shaft 15 is set to ±0 (second position), and the torque sensor value is set to ±0 (pre-change torque). The second position means the position of the arm 16 that provides a basis for torque detection in the mechanical deviation detection flow. Namely, the second position means the position of the arm 16 at which the torque sensor value is detected before and after rotation of the arm 16, in the mechanical deviation detection flow. The pre-change torque means torque detected by the torque sensor 14 before the position of the arm 16 is changed from the second position, in the mechanical deviation detection flow. In this embodiment, the rotational angle of the arm 16 at the second position is set to 0° and the pre-change torque is set to ±0, so as to exclude an influence of gravitational torque as much as possible, and simplify calculations. However, the invention is not limited to this manner of setting the angle and torque.

Then, the controller 17 controls the motor 12 so as to rotate the arm 16 from 0° (second position) to 45° (third position) (see FIG. 3B). In FIG. 3B, the arm 16 (the rotary shaft 15) is rotated by 45° in a direction (first rotational direction) in which the arm 16 moves to the right, as viewed from the front of the arm device 1. The third position is a position or destination to which the arm 16 is moved from the second position, so as to bring about an error(s) associated with a mechanical deviation(s). The third position is not limited to 45° as measured from the second position, but may be any position that is different from the second position. However, if the rotational angle is small, an error may arise in the result of detection, and the mechanical deviation may not be detected with high accuracy. Therefore, the rotational angle is preferably 45° or larger.

Then, the controller 17 controls the motor 12 to rotate the arm 16 so that the angle of the arm 16 changes from 45° (third position) to 0° (second position) (see FIG. 3C). Namely, the arm 16 (the rotary shaft 15) is rotated by 45° in a direction (second rotational direction) in which the arm 16 moves to the left, as viewed from the front of the arm device 1. In other words, the arm 16 is returned to the position (angle 0°) at which the arm 16 is located before the rotary motion thereof.

In the condition where the angle of the arm 16 is equal to 0° again, the torque sensor 14 detects torque (post-change torque) applied to the rotary shaft 15. Then, the torque sensor 14 outputs the detected torque value (post-change value) to the controller 17. The post-change torque means torque applied to the rotary shaft 15, in a condition where the arm 16 is moved from the second position to the third position and moved back to the second position. Namely, the post-change torque means torque detected at the second position again, after the position of the arm 16 is changed from the second position, in the mechanical deviation detection flow. The controller 17 calculates a correction value (offset value) that makes the detected torque value equal to ±0. Namely, the controller 17 calculates a difference between the torque value 0 set before rotation of the arm 16 and the torque value after rotation of the arm 16. The difference is an error associated with mechanical deviation, and provides the correction value.

While the correction value is calculated for the case where the arm 16 is first rotated to the right in the example of FIG. 3A-FIG. 3C, similar calculation is conducted for the case where the arm is first rotated to the left. Namely, two correction values in total, i.e., one correction value corresponding to the right-hand rotational direction and one correction value corresponding to the left-hand rotational direction, are calculated.

The two correction values thus calculated are stored in a memory (not shown) of the controller 17, such that the correction values are respectively associated with the rotational directions. Through the above operation, the mechanical deviation detection flow ends.

Figures 4A, 4B, 4C:
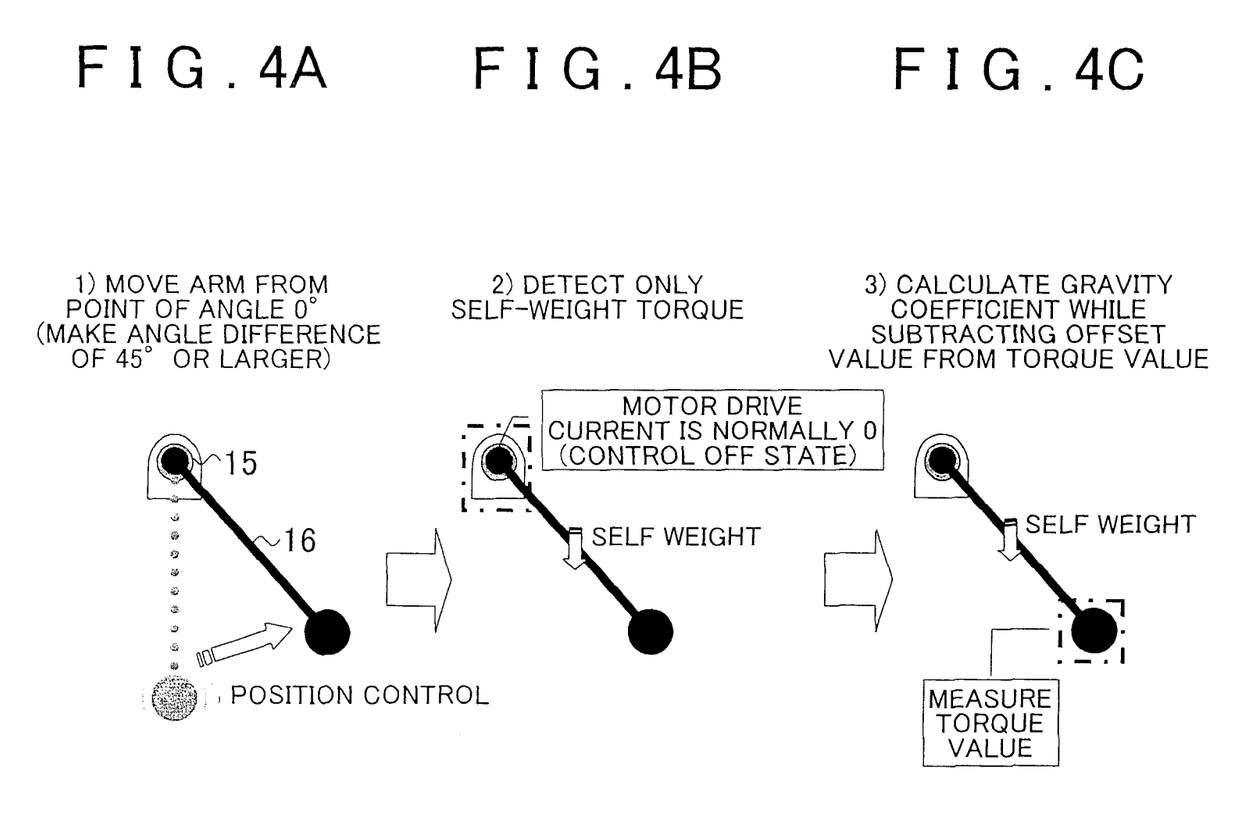

Next, a gravity coefficient is calculated. More specifically, a gravity coefficient used for calculating gravitational torque corresponding to the angle of the arm 16 is calculated. FIG. 4A-FIG. 4C are useful for explaining the gravity coefficient calculation flow. Initially, the controller 17 controls the motor 12, so as to rotate the arm 16 to an angular position of 45° (first position) (see FIG. 4A). While the angle of rotation used at this time is not limited to 45°, the angle is preferably equal to or larger than 45° so that gravitational torque associated with the self weight of the arm 16 is definitely detected.

Then, the controller 17 temporarily stops output of the motor drive current (or stop the current control itself), at a point in time at which the arm 16 is rotated to the position of 45°. Namely, the controller 17 stops the position control of the arm 16. As a result, the operation of the motor 12 is stopped, and only the gravitational torque is applied the rotary shaft 15 (see FIG. 4B). Namely, the torque applied to the rotary shaft 15 does not include any other torque than the gravitational torque.

The torque sensor 14 detects torque applied to the rotary shaft 15 in the condition where the output of the motor drive current is stopped. As described above, the torque detected at this time is only the gravitational torque (pre-correction gravitational torque). Thus, the torque sensor 14 can detect only the gravitational torque applied to the rotary shaft 15.

Then, the controller 17 subtracts the correction value calculated in the above-described mechanical deviation detection flow, from the pre-correction gravitational torque detected by the torque sensor 14. In this manner, the controller 17 can calculate gravitational torque from which an influence of mechanical deviation has been removed (see FIG. 4C).

At this time, one of the two correction values corresponding to the rotational direction in which the arm 16 is rotated for detection of pre-correction gravitational torque is used as the correction value subtracted from the pre-correction gravitational torque. In FIG. 4C, the correction value corresponding to the right-hand direction is used since the arm 16 is rotated in the right-hand direction as viewed in FIG. 4C.

Then, the controller 17 calculates a gravity coefficient, using the shaft angle of the rotary shaft 15 (the angle of the arm 16) measured when the pre-correction gravitational torque is detected. More specifically, the gravity coefficient is calculated, using Eq. (1) below. In the equation as indicated below, "torque value" represents pre-correction gravitational torque that is detected by the torque sensor 14, in a condition where the output of the motor drive current is being stopped. The controller 17 stores the calculated gravitational coefficient in a memory (not shown).

Gravity coefficient=(torque value [Nm]−correction value)/sin(shaft angle [rad])     (1)

Through the above-described operation, the gravity coefficient calculation flow ends. In the example of FIG. 4A-FIG. 4C, the arm 16 is rotated to the right as viewed in these figures, for calculation of the gravity coefficient. However, the direction of rotation of the arm 16 is not limited to the right-hand direction, but the arm 16 may be rotated in either the left or right direction. The "mechanical deviation detection flow" and "gravity coefficient calculation flow" may be implemented only once before servo control is performed.

Finally, actual output torque is detected. More specifically, gravity compensation is made on the arm 16 during servo control, and actual output torque is detected. Here, the actual output torque means torque obtained by removing torque produced due to an error associated with mechanical deviation of the arm 16 during servo control, and the gravitational torque of the arm 16, from the output torque detected by the torque sensor 14. In other words, the actual output torque means torque that has been compensated for the torque of the error produced due to mechanical deviation and the gravitational torque, namely, torque that is substantially or actually applied to the rotary shaft 15.

More specifically, the controller 17 calculates the actual output torque, according to steps as indicated by Eq. (2)-Eq. (4) below. Initially, the correction value (or intermediate correction value) calculated in the mechanical deviation detection flow is subtracted from operating torque detected during servo control (Eq. (2)). The operating torque means torque applied to the rotary shaft 15 during servo control. In other words, the operating torque is represented by a torque sensor value obtained by the torque sensor 14 during servo control. Therefore, the operating torque includes all of the actual output torque, gravitational torque, and torque of error associated with mechanical deviation. In the following description, the operating torque will also be called "torque sensor value". Then, the controller 17 calculates the gravitational torque of the arm 16 by multiplying the gravity coefficient calculated in the gravity coefficient calculation flow, by the angle of the arm 16 during servo control (Eq. (3)). Further, the controller 17 calculates the actual output torque (Eq. (4)), by subtracting the gravitational torque from corrected torque obtained by subtracting the correction value from the torque sensor value according to Eq. (2).

Corrected torque [Nm]=torque sensor value [Nm]−correction value (or intermediate correction value)    (2)

Gravitational torque [Nm]=gravity coefficient×sin (shaft angle[rad])    (3)

Actual output torque [Nm]=correction torque [Nm]−gravitational torque [Nm]    (4)

Here, the method (step of Eq. (2)) of removing a torque error associated with mechanical deviation from the torque sensor value obtained during servo control will be specifically described. The controller 17 subtracts the correction value calculated in the mechanical deviation detection flow from the torque sensor value (operating torque), based on the direction of rotation of the arm 16.

As a principle, the controller 17 calculates output torque that excludes any torque error associated with mechanical deviation, by subtracting the correction value corresponding to the direction of rotation of the arm 16 from the torque sensor value.

Figure 5A:
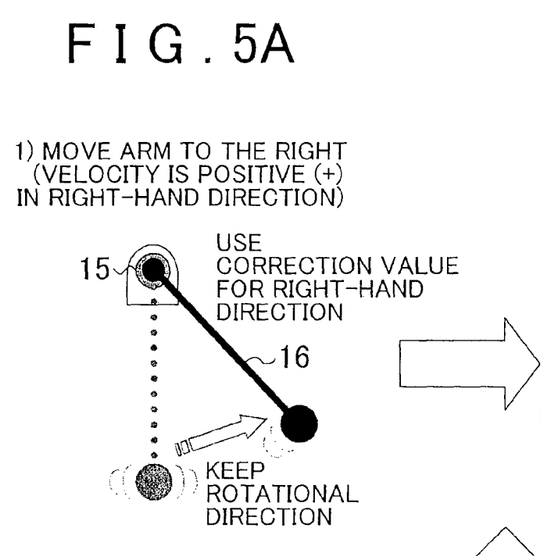

For example, in the case where the arm 16 moves to the right (in the case where the velocity is positive (+) when measured from the left to the right), the controller 17 determines the rotational direction of the arm 16, based on the encoder signal, and holds the rotational direction. Then, the controller 17 subtract the correction value corresponding to the thus determined rotational direction (right-hand direction), out of the correction values calculated in the mechanical deviation detection flow, from the torque sensor value (see FIG. 5A).

Figure 5B:
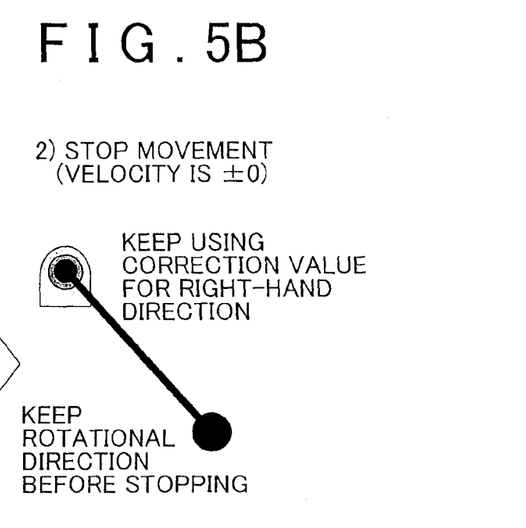

Next, the operation performed when the rotational direction is switched or changed will be described. The controller 17 determines that the rightward velocity becomes equal to ±0, based on the encoder signal. At this time, the controller 17 continues to subtract the correction value corresponding to the right-hand direction from the torque sensor value (see FIG. 5B).

Figure 5C:
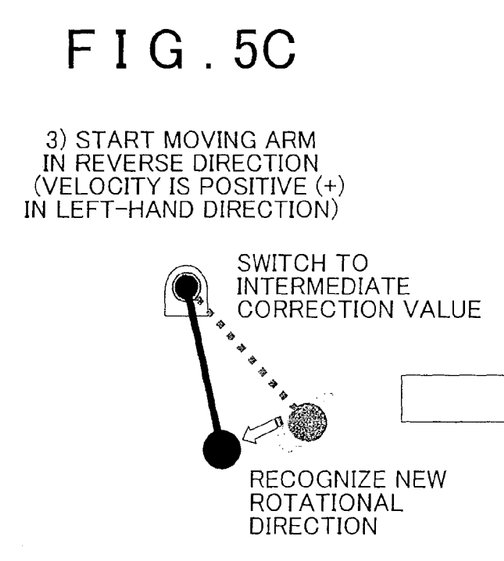

Immediately after the rotational direction of the arm 16 switches from the right-hand direction to the left-hand direction (immediately after the velocity becomes positive (+) when measured from the right to the left), the controller 17 determines the rotational direction of the arm 16, based on the encoder signal, and holds the rotational direction (left-hand direction) after switching. At the same time, the controller 17 calculates an intermediate correction value, and subtracts the intermediate correction value, in place of the correction value corresponding to the right-hand direction, from the torque sensor value (see FIG. 5C). At this time, the controller 17 determines the rotational direction of the arm 16, based on detection of the motor speed of a given level or higher in the reverse direction.

Figure 5D:
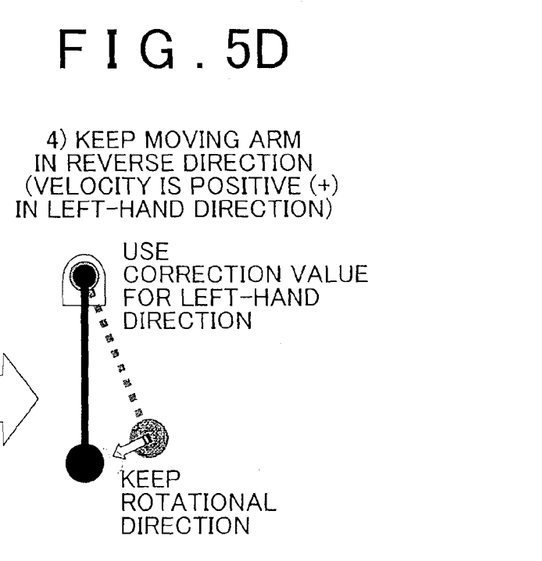

Here, the intermediate correction value means a value between the two correction values that correspond to the left-hand direction and the right-hand direction and are calculated in the mechanical deviation detection flow. Specifically, when the rotational direction switches from the right-hand direction to the left-hand direction, the intermediate correction value changes in a stepwise fashion from the correction value corresponding to the right-hand direction to the correction value corresponding to the left-hand direction. More specifically, the controller 17 increases or reduces the intermediate correction value in a stepwise fashion, based on the processing cycle of a motor driver, so that the intermediate correction value becomes closer to the correction value corresponding to the left-hand direction, away from the correction value corresponding to the right-hand direction. In other words, the intermediate correction value increases or, decreases as the rotational velocity of the arm 16 increases from ±0 in the left-hand direction. Namely, the intermediate correction value increases or decreases in accordance with the rotational velocity of the arm 16. Once the intermediate correction value reaches the correction value corresponding to the left-hand direction, the correction value corresponding to the left-hand direction is subsequently used (see FIG. 5D). In other words, the controller 17 does not instantly switch the correction value to the correction value corresponding to the left-hand direction, immediately after the rotational direction of the arm 16 switches from the right-hand direction to the left-hand direction.

Suppose the correction value corresponding to the left-hand direction is 85, while the correction value corresponding to the right-hand direction is 95, for example, and the intermediate correction value changes by one for each cycle of the motor driver (the amount of change is 1). In this case, if the rotational direction of the arm 16 switches from the left-hand direction to the right-hand direction, the intermediate correction value becomes equal to 86 (85+1=86), after a lapse of one cycle of the motor driver as measured from the time of switching to the right-hand direction. Then, the controller 17 increases the intermediate correction value by one (or increments the intermediate correction value) for each cycle of the motor driver. If time corresponding to ten cycles of the motor driver elapses from the time when the rotational direction of the arm 16 switches to the right-hand direction, the intermediate correction value becomes equal to 95 (85+10=95), and thus reaches the correction value corresponding to the right-hand direction. Thereafter, the correction value 95 corresponding to the right-hand direction is used until the rotational direction switches from the right-hand direction to the left-hand direction.

On the other hand, if the rotational direction of the arm 16 switches from the right-hand direction to the left-hand direction, the intermediate correction value becomes equal to 94 (95−1=94), after a lapse of one cycle of the motor driver as measured from the time of switching to the left-hand direction. Then, the controller 17 reduces the intermediate correction value by one for each cycle of the motor driver. If time corresponding to ten cycles of the motor driver elapses from the time when the rotational direction of the arm 16 switches to the left-hand direction, the intermediate correction value becomes equal to 85 (95−10=85), and thus reaches the correction value corresponding to the left-hand direction. Thereafter, the correction value 85 corresponding to the left-hand direction is used until the rotational direction switches from the left-hand direction to the right-hand direction. Thus, the correction value is changed in a stepwise fashion for a certain period immediately after switching of the rotational direction of the arm 16, so that the correction value is prevented from being rapidly changed, and the actual output torque can be smoothly changed.

While the intermediate correction value is changed by one for each cycle of the motor driver in the above embodiment, the amount of change is not limited to one, but may be set as appropriate. While the cycle of the motor driver is used as a cycle of change of the intermediate correction value, the intermediate correction value may be changed for each increase of the rotational velocity, or at given time intervals, or each time the rotary shaft 15 rotates by a given rotational angle. The intermediate correction value may also be set to a fixed value (e.g., an average value of the correction value corresponding to the left-hand direction and the correction value corresponding to the right-hand direction). If the arm 16 is subjected to rapid reverse braking (rapid switching of the rotational direction), the correction value may be instantly switched from the correction value corresponding to the current rotational direction to the correction value corresponding to the opposite direction, without using any intermediate correction value.

According to the torque detecting method of this embodiment as described above, the gravity coefficient is calculated, based on gravitational torque detected by the torque sensor 14. Also, gravitational torque is detected, based on the angle of the arm 16 detected during servo control and the gravity coefficient. Then, the actual output torque during servo control is calculated, based on the torque sensor value (operating torque) and gravitational torque detected during servo control. Therefore, there is no need to grasp the mass of the arm 16 and the position of the center of gravity of the arm 16 when calculating the gravity coefficient, which makes it possible to easily make gravity compensation.

Since there is no need to grasp the mass of the arm 16 and the position of the center of gravity thereof when making gravity compensation, the gravity coefficient can be easily obtained again, even when the arm 16 mounted on the rotary shaft 15 is changed, or when another component or device is added to the arm device.

In the torque detecting method of this embodiment, a torque error associated with mechanical deviation is calculated in advance, and the torque error is removed from the torque sensor value when the gravity coefficient is calculated and the actual output torque is detected. Thus, the actual output torque can be detected with improved accuracy.

It is to be understood that the invention is not limited to the above-described embodiment, but the embodiment may be modified or combined with another arrangement as needed, without departing from the principle of the invention.

The invention claimed is:

1. An arm device, comprising:
   an arm operable to rotate integrally with a rotary shaft;
   a driving device that drives and rotates the arm;
   a torque detector that detects torque applied to the rotary shaft of the arm;
   a position detector that detects a position of the arm; and
   a controller that outputs a control signal to the driving device so as to perform position control on the arm, wherein:
   the torque detector detects gravitational torque applied to the rotary shaft in a condition in which the controller stops the position control of the arm, when the arm is located at a first position at which the arm is oriented in a direction that is different from a direction of gravitational force;
   the controller calculates a gravity coefficient used for calculating gravitational torque corresponding to a position of the arm, based on the gravitational torque and the first position;
   the controller calculates the gravitational torque during the position control, based on the position of the arm detected by the position detector during the position control of the arm, and the gravity coefficient;
   the controller calculates actual output torque applied to the rotary shaft during the position control, based on operating torque applied to the rotary shaft and detected by the torque detector during the position control, and the gravitational torque calculated during the position control; and
   the controller outputs the control signal to the driving device, based on the actual output torque, so as to rotate the arm.

2. The arm device according to claim 1, wherein:
   the torque detector detects a first change torque applied to the rotary shaft, in a condition in which the arm is located at a second position; and
   detects a second change torque applied to the rotary shaft in a condition in which the arm is located at the second position again, after the driving device rotates the arm from the second position to a third position and rotates the arm from the third position back to the second position; and
   the controller calculates a correction value, based on the first change torque and the second change torque, wherein
   the actual output torque during the position control is calculated based on the operating torque, and the correction value.

3. The arm device according to claim 2, wherein:
   the correction value comprises a first correction value corresponding to a first rotational direction of the arm, and a second correction value corresponding to a second rotational direction of the arm; and
   the actual output torque is calculated, based on a correction value corresponding to a rotational direction of the arm determined during the position control, which correction value is selected from the first correction value and the second correction value.

4. The arm device according to claim 3, wherein the actual output torque is calculated, based on an intermediate correction value between the first correction value and the second correction value, for a given period immediately after the rotational direction of the arm switches from the first rotational direction to the second rotational direction during the position control.

5. The arm device according to claim 4, wherein the intermediate correction value increases or decreases according to change in a rotational velocity of the arm.

6. The arm device according to claim 4, wherein the intermediate correction value increases or decreases as time passes from switching of the rotational direction of the arm.

7. The arm device according to claim 2, wherein gravity coefficient is calculated based on the correction value.

* * * * *